FIG_1a

Oct. 27, 1959      J. O. HANNIBAL, JR      2,909,995
PRINT CHECKING CIRCUIT FOR ACCOUNTING MACHINES
Filed Dec. 31, 1956      5 Sheets-Sheet 3

FIG_1c_

Oct. 27, 1959    J. O. HANNIBAL, JR    2,909,995
PRINT CHECKING CIRCUIT FOR ACCOUNTING MACHINES
Filed Dec. 31, 1956    5 Sheets-Sheet 4

| FIG. 1a. | |
|---|---|
| FIG. 1b. | FIG. 1c. |

FIG. 2

United States Patent Office 2,909,995
Patented Oct. 27, 1959

2,909,995
PRINT CHECKING CIRCUIT FOR ACCOUNTING MACHINES

Joseph O. Hannibal, Jr., Vestal, N.Y., assignor to International Business Machines Corporation, New York, N.Y., a corporation of New York Application December 31, 1956, Serial No. 631,868

9 Claims. (Cl. 101—93)

This invention relates to checking means for printing devices and more specifically to a checking circuit for character printing elements of an accounting machine or the like.

Although the invention may be utilized with a variety of other printing devices, for example those of the reciprocating type, it is shown incorporated with a wheel printing mechanism of the type employed in a well-known IBM machine referred to as the Type 407 accounting machine which is shown and described in detail in the Patent No. 2,569,829, issued to E. J. Rabenda on October 2, 1951, which patent is assigned to the common assignee.

The main object of the invention resides in the provision of an extremely accurate, reliable and versatile checking circuit for printing elements.

Another object resides in the provision of a novel concept in checking in which data code receiving elements of the checking circuit are compared with code receiving elements set up under control of the printing devices.

A more specific object resides in the provision of an accurate checking circuit in which the comparing elements thereof are controlled by redundant bit signals derived from the data to be printed and those generated mechanically by the printing mechanism.

Other objects of the invention will be pointed out in the following description and claims and illustrated in the accompanying drawings, which disclose, by way of examples, the principle of the invention and the best mode, which has been contemplated, of applying that principle.

The printing mechanism referred to above is shown and described in complete detail in the aforementioned Rabenda patent. For our present purpose, it will suffice to show and explain briefly only those portions of the printing mechanism which are necessary to the invention.

Figure 3:
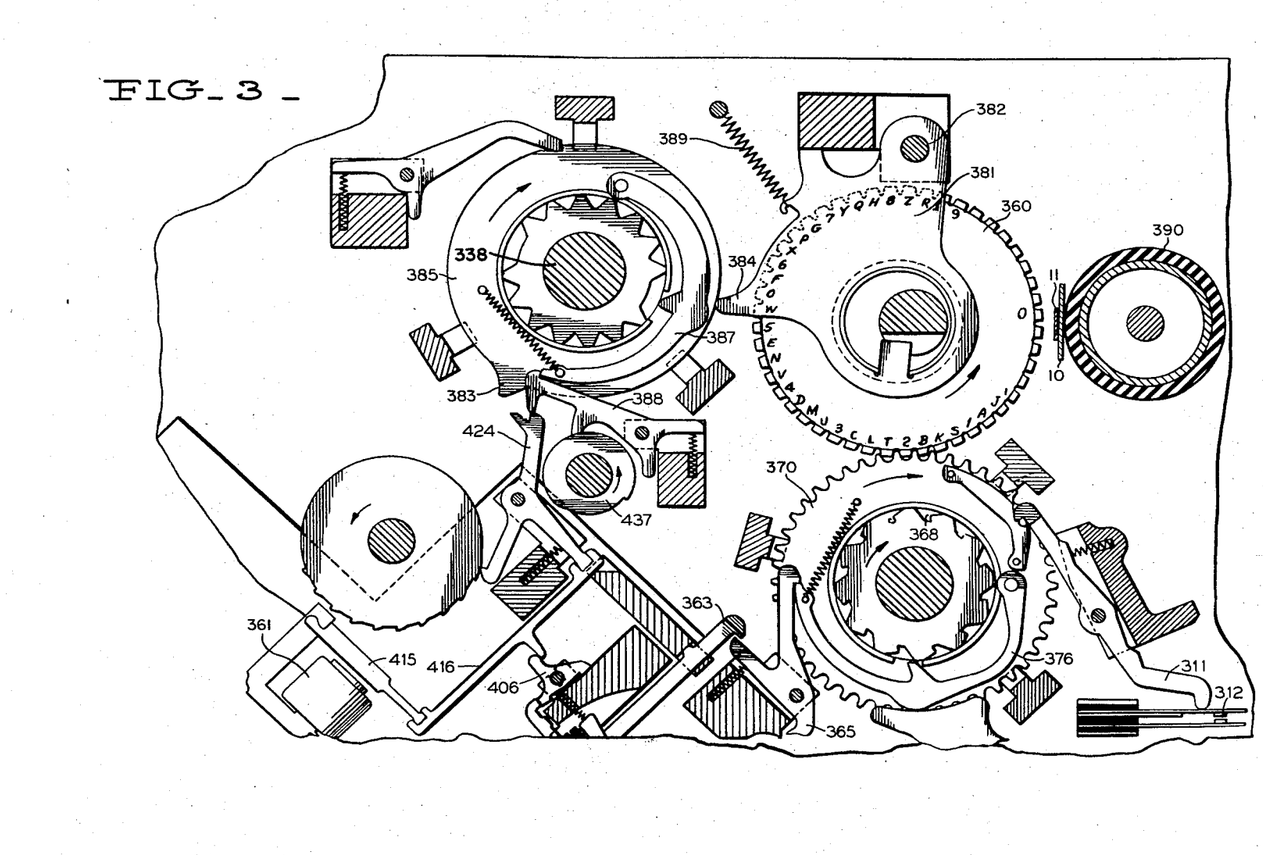
Fig. 3 shows a portion of the printing mechanism of the Type 407 accounting machine.

Referring to Fig. 3 of the instant application, there is shown a printing wheel 360 having a full complement of alphabetic, special and numeric type elements 0 through 9 disposed on the periphery of the wheel. This wheel 360 is carried by a carrier member 381 freely pivoted on a shaft 382 suitably journaled in the framework of the printing mechanism. The carrier 381 is further provided with a projection 384 adapted for cooperation with a cam-like projection 383 disposed on the periphery of a disc 385 bearing a clutch dog 387 which, when released, engages a print cam shaft 338. The latter is normally in rotation and accordingly imparts rotative motion to the disc 385 which in turn causes the carrier member 381 to swing counterclockwise thereby causing a character, selected in a manner described in said Rabenda patent, to be impressed against a ribbon 11 and a sheet 10 supported on a platen 390. In general, selection of a character is effected by energizing a print magnet 361, one associated with each printing position, by two impulses, each occurring at differential times within two portions of the print cycle. In the first portion of the print cycle, a data impulse (numeric) energizes the print magnet 361 to cause rotation of a selector gear 370, which is engaged with the print wheel 360, in the following manner: Armature 415, when attracted, operates the pull rod 416, the latter operating a latch 363 under control of the series of pawls 406 for releasing a clutch member 365. The latter unlatches a dog, carried by the gear 370, to engage a rotating fluted shaft 368 which enables the gear 370 to rotate to cause rotation of the print wheel 360.

The second impulse (zone) to the magnet may occur at any one of four different times in the second portion of the print cycle. In the case of a numeric character, the print magnet 361 is energized at "N" time, as explained in the Rabenda patent, to effect printing of a numeric character. This operation includes mechanical action originating with the armature 415, member 424, cam 437 which is effective only during the second portion of the print cycle to release latch member 388. The latter enables the dog 387 to engage and cause the disc 385 to rotate thereby causing the print wheel to be swung counterclockwise in the manner explained.

Attending each printing operation is the issuance of a so-called "echo" pulse which is issued 150° after the print magnet is initially energized in each print cycle. The echo pulse is issued upon closure of a contact 312, one for each printing position under control of an associated contact operating member 311 disposed to cooperate with the peripheral surface of an associated gear 370.

In the general operation of the Type 407 accounting machine, detail record cards bearing items of data, constituted of numeric or alphabetic information, are passed sequentially through a feed having first and second read stations. The data is generally in decimal form so that translators and the like are unnecessary for the processing and printing of the data passed through the machine. The machine in its general mode of operation is thus adapted to be controlled by these individual record cards which are punched according to the familiar IBM twelve hole code. There are occasions when it becomes necessary to process data which is recorded on tape. On these occasions, a tape reader is required to process the tape so that the data can be made available and in the form necessary for operating the Type 407 machine. In some instances, the data recorded on the tape appears in binary coded form, for example the familiar 1-2-4-8 bit code to express the ten decimal digit values 0 through 9. To further provide for checking in the prior art machines, it has been the practice to provide a redundant check bit so that all coded character representations may be expressed as either an even number or an odd number of bits. In these latter checking schemes, expensive registers have been employed to count the bits and the resulting count compared with a bit count derived from another register. By this method, a check is then made of the validity of the code data read into the machine. Printing of this data requires conversion from the binary form to the numerical form. Errors arising during the conversion and during the printing operation necessitates complex translators which have proven to be very expensive.

The present invention provides a novel checking arrangement for comparing the redundant bit signals provided by the code data read into the machine with differentially timed redundant bit signals issued by timing devices incorporated in the printing machine. In one mode of operation the redundant bit, also referred to hereinafter as a C bit, is provided in those instances where an odd bit count is desired for the representation of the digit values 0 through 9 as shown below in the accompanying chart.

|       | Binary code |   |   |   |     |
|-------|---|---|---|---|-----|
|       | 1 | 2 | 4 | 8 | "C" |
| 0     |   |   |   | x | x   |
| 1     | x |   |   |   |     |
| 2     |   | x |   |   |     |
| 3     | x | x |   |   | x   |
| 4     |   |   | x |   |     |
| 5     | x |   | x |   | x   |
| 6     |   | x | x |   | x   |
| 7     | x | x | x |   |     |
| 8     |   |   |   | x |     |
| 9     | x |   |   | x | x   |
| Blank |   |   |   |   | x   |

As seen in this chart, a redundant bit (C bit) is provided for the decimal values 0-3-5-6 and 9, and for blank column indication. In another mode of operation it may be appreciated that the system is equally effective where it is desirable to make the bit count even, in which case a C bit would be supplied for values 1-2-4-7 and 8.

A relay system, to be explained, is provided to store the presence or the absence of the C bit. These two conditions, that is the presence of or the absence of a C bit, is compared with the presence or absence of a C bit generated during the print cycle by mechanical means at differential times of the print cycle corresponding to the values 0-3-5-6-9 and at X time in the one mode of operation, or at differential times corresponding to the values 1-2-4-7 and 8 in the second mode of operation. These conditions are set up in a comparing circuit which is tested at each point 0 through 9 including X time of the print cycle. If certain conditions are not met at any time 0 through 9 and X time during either half of the print cycle, an error signal is generated to manifest an error condition which may be utilized in a variety of ways. Before entering upon a detailed description of this checking scheme, it may be in order to explain the circuit diagram shown in Figs. 1a through 1c.

Figure 1A:
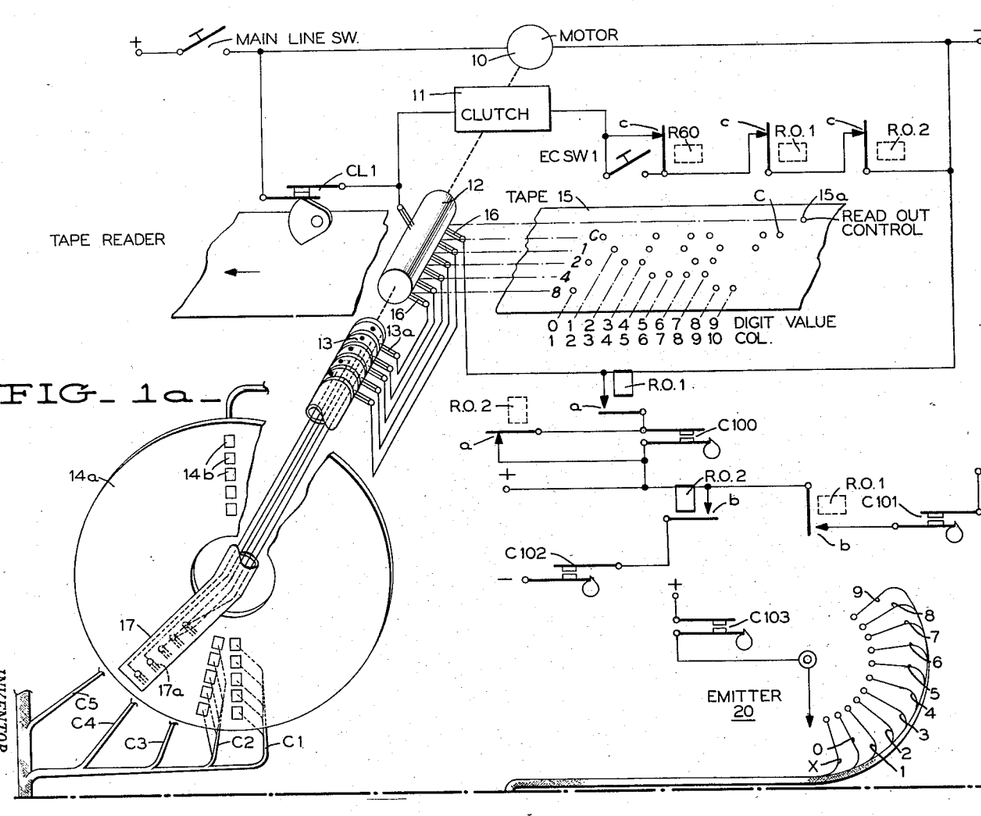
Figs. 1a, 1b and 1c constitute the major portion of the wiring diagram constituting the invention.
Figure 1B:
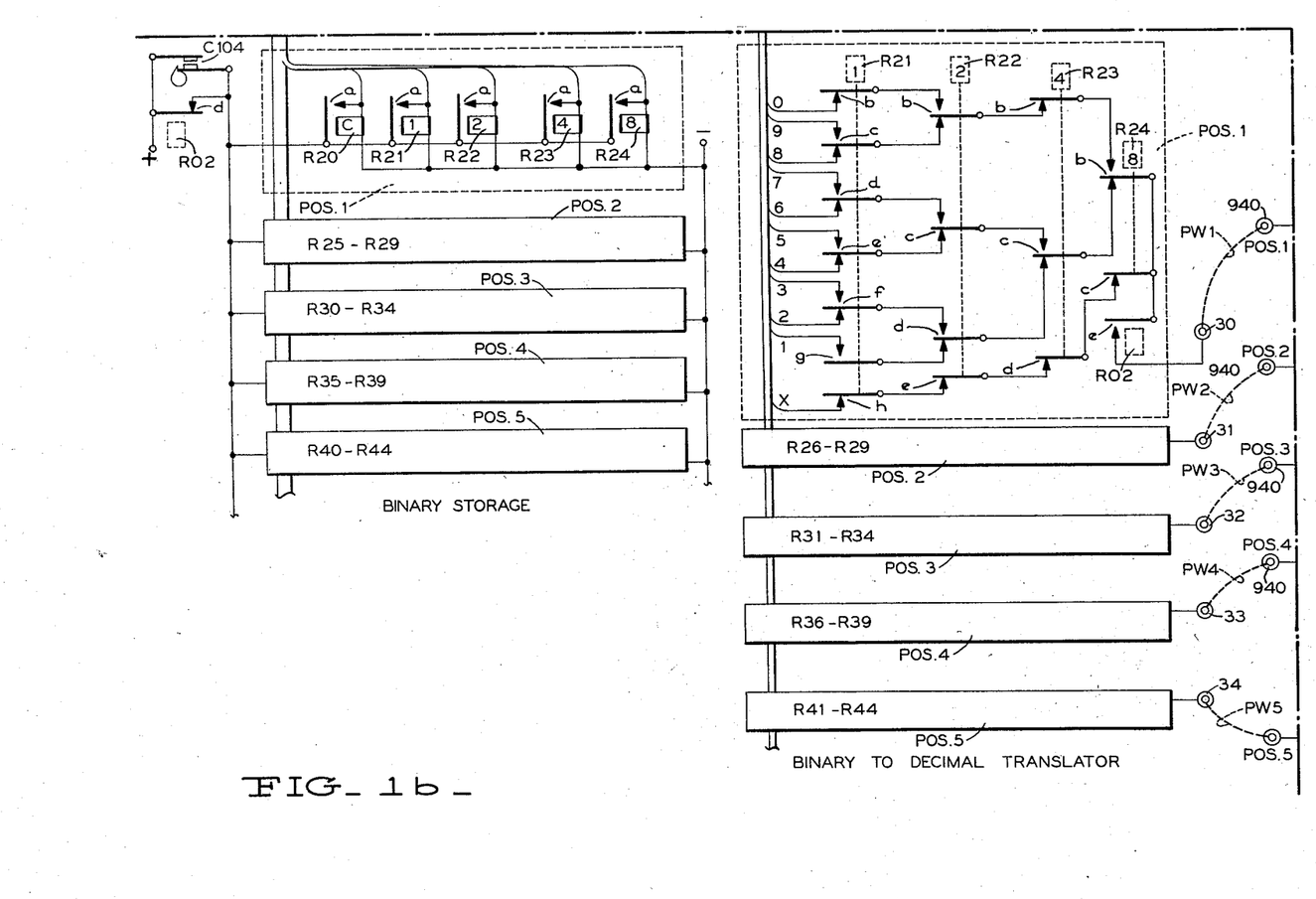

In Fig. 1a, there is shown in diagrammatic form a serial type tape reader adapted to scan the vertical columns of binary coded representations recorded on the tape. This serial type of tape reader is constituted essentially of a drive motor 10, a clutch mechanism 11, shown in box form, a reading station including a contact roll 12 and scanning brushes 16, a commutator 13 with appropriate brushes 13a and an emitter assembly comprised of an insulated readout disc 14a having metallic inserts 14b radially aligned in groups of five in equally spaced concentric circles, each group of five radially aligned inserts corresponding to each column of data recorded on the tape. Each group of five inserts is adapted to be scanned serially by a wiper 17 bearing five contact fingers 17a each adapted to concurrently engage each of the five inserts in a group. Successive groups of five inserts are scanned in succession upon rotation of the wiper 17 which rotation is coordinated with the passage of the tape 15 bearing the spaced columns of coded information. This coded information is in binary form as indicated on a portion of the tape. The bit representations 1, 2, 4, 8 and C are shown along parallel lines running lengthwise of the tape.

A special perforation 15a is employed to indicate the end of each data group on the tape and provides an appropriate readout signal which is utilized in a manner to be explained. It may be appreciated that the number of columns recorded on the tape and the number of groups of inserts on the readout disc 14a determine to a large extent the location of the perforation 15a.

The tape 15 is adapted to be fed by cooperating means, not shown, to insure proper feeding of the tape through the reading station. Beneath the contact roll 12 is a line of reading brushes 16 of which six are shown. Five of these brushes are spaced in accordance with the code bit spacing on the tape and are thus capable of reading the bit representations concurrently appearing in each column of the tape, which columns are serially encountered as the tape passes through the reading station of the tape reader.

Figure 4:
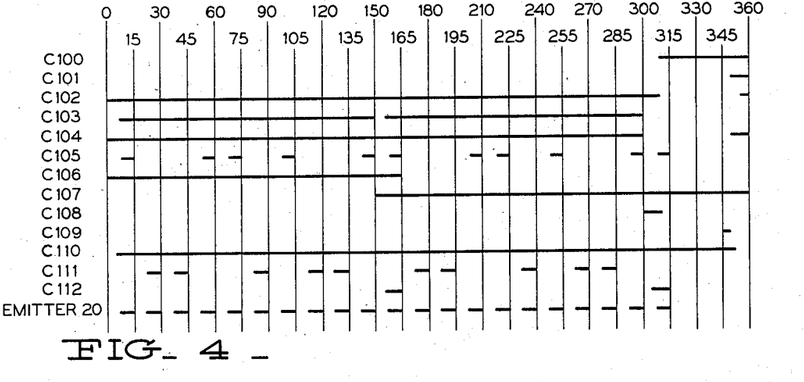
Fig. 4 is a time chart.
Figure 5:
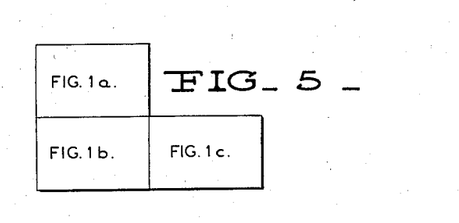
Fig. 5 shows how the Figs. 1a, 1b and 1c are arranged to form the main wiring diagram of the invention.

Also shown in Fig. 1a are circuits for controlling the clutch 11 to show generally how coordination is possible between the tape reader and the Type 407 machine. To this end there is provided a pair of readout control relays RO1 and RO2, the former being energized under control of the special designation 15a. Relay RO1 has a hold circuit which extends through the relay RO1, relay RO1a normally open contacts, cam contacts C100 and relay RO2a normally closed contacts in parallel therewith to a plus terminal. It may be appropriate at this time to mention that in the Type 407 machine certain of the cam contacts are designated as CR, denoting continually running, and these are included in the wiring diagram of the instant application. The cam contacts designated as C cams, the timings of which are shown in the time chart of Fig. 4 of the instant application, are also continually running and include those associated with the printing mechanism to carry out the features of the present invention. Upon closure of relay RO1b contacts and cam contacts C101, a circuit is established to energize relay RO2, a hold circuit for the latter being established through RO2b and cam contacts C102. The coordination of control between the reader and the 407 machine is effected in general by proper control of the reader clutch 11 by means of an exemplary circuit which extends from a plus terminal through card lever contacts CL1, clutch 11, an error control relay R60c normally closed contacts or, by way of an error control switch ECSW1 if error control is to be bypassed, through relay RO1c normally closed contacts, relay RO2c normally closed contacts to a minus terminal.

Appropriate cable connections are employed to pass the tape data scanned by the reader to a buffer storage of which five positions are used for illustrative purposes to store a five place decimal amount. One of these positions, position 1, is shown comprised of five relays, namely, R20 through R24, for storing the bit representations common to a column of tape data. The four remaining storage positions, position 2 through position 5, are shown in block form, each block containing an appropriate set of five relays numbered as follows: position 2, relays R25 through R29; position 3, relays R30 through R34; position 4, relay R35 through R39; position 5, relay R40 through relay R44. Hold circuits are provided for these relays under control of cam contacts C104 and readout relay RO2d normally closed contacts.

Associated with each buffer storage position is a binary-to-decimal translator adapted to be controlled by an emitter 20, cam contact C103, and a readout relay RO2e normally open contact points. The emitter, being of a well-known type, is driven by the 407 machine by suitable means, not shown, to provide timed digit output values 0 through 9 and X time in coordination with the printing cycle of the machine. Of the five translator positions shown, the first is shown in detail while the remaining four are in block form each containing an appropriate set of relay contacts adjusted under control of their associated parent relays. The translator shown for position 1 is comprised of relay contacts b through h associated with the relay R21, b, c, d and e contacts of the relay R22, b,

*c* and *d* contacts of relay R23, and R24*d* and R24*c* contact. These contacts are arranged to provide differentially timed digit outputs as well as an X timed output at appropriate times in the print cycle, the digit value output being determined of course by fixed bit combinations of binary bits stored in the corresponding position of binary storage, while an X timed output is provided in the absence of the fixed combinations as a result of a blank column. The output of each translator position is connected to a plug socket, five of which are shown and identified respectively as 30 through 34. These in turn are connected by means of plug wires PW1 through PW5, to plug sockets 940, positions 1 through 5, the latter representing input sockets shown in Fig. 31*i* of the aforementioned Rabenda patent.

Figure 1C:
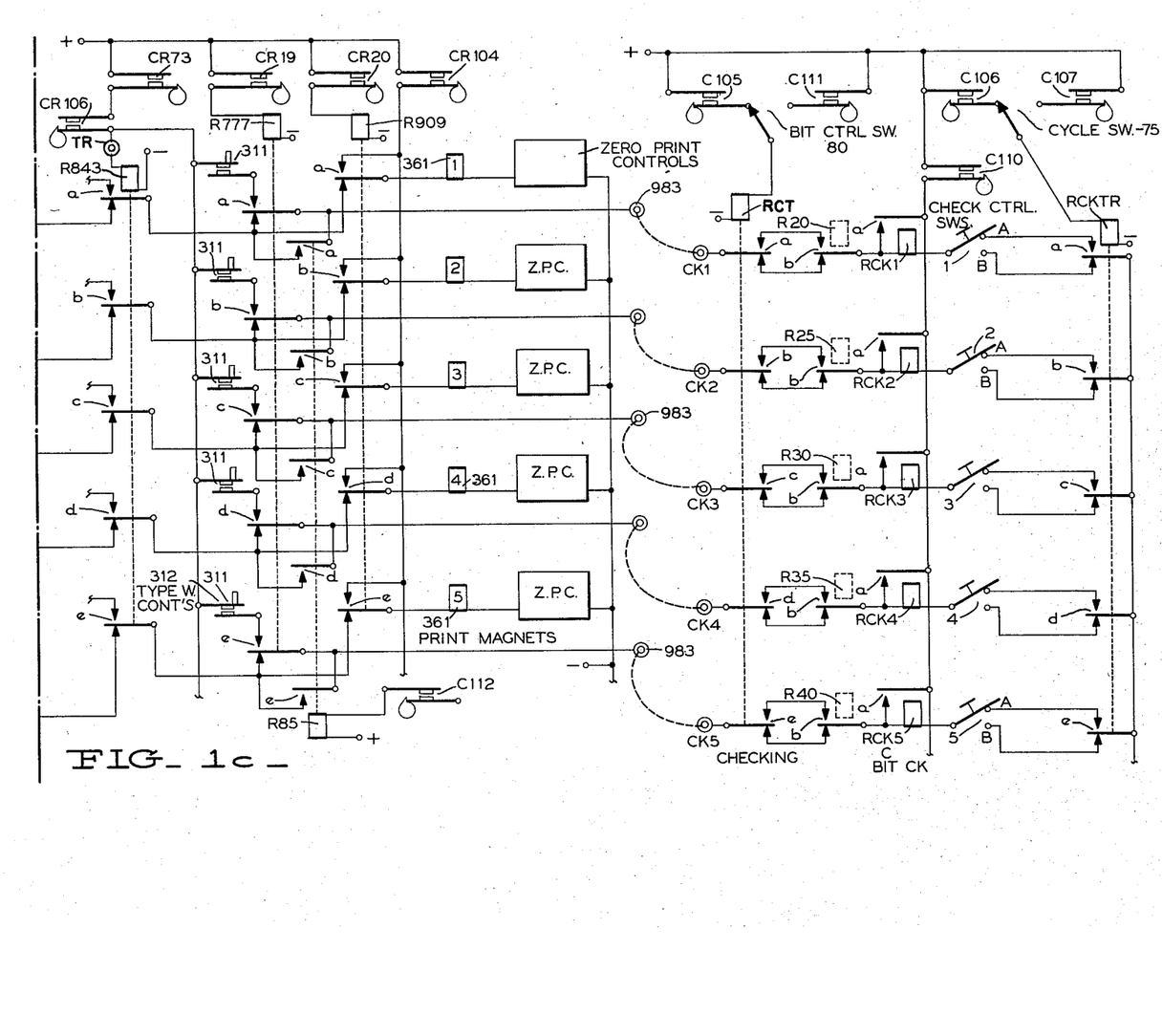

In Fig. 1*c* of the instant application, the print magnets, type wheel contacts and their associated operating arms are identified respectively as 316, 312, and 311. These contacts 312 are interconnected with contacts associated with relay R843, R777, and R909, in the manner shown, to control energization of the print magnets in the manner described in the afore-mentioned Rabenda patent. To provide for the transmission of X timed impulses through the various print entry circuits, a plurality of contacts, R85*a* through R85*e*, one for each circuit, is employed. The parent relay R85 is adapted to be controlled by means of a cam contact C112.

It may be appropriate to mention at this point that as a matter of choice in the preparation of the tape, the C bit may be dispensed with for indicating blank columns. Under these conditions, suitable blank column detecting means may be employed to generate a C bit.

Further seen in Fig. 1*c* of the instant application are two vertical columns of plug sockets connected together by plug wires, the left column of sockets being identified as 983 and the right column of sockets being identified as CK1 through CK5. The left column represents the normal print entry sockets which are normally wired in the manner described in the Rabenda patent for causing the printing of amounts and other numerical designations. The sockets CK1 through CK5 represent inputs to the comparing checking circuits constituting a portion of the invention. Each checking socket CK is wired to a checking circuit, a typical one comprising a C bit timing relay contact, for example RCT*a*, the parent relay RCT for which being selectively operable by means of cam contacts C105 and C111 under control of a bit control switch 80; a C bit relay contact R20*b*, a Check Control Switch and a transfer contact under control of a check transfer control relay RCKTR which is selectively energizable, under control of a Cycle Switch 75, either during the first or the last half of a print cycle depending upon the position of the switch.

Concerning operations of the relay RCT, the position of the switch 80 determines whether the invention is to be operated in one or another of the afore-mentioned two modes of operation. For instance, when the switch 80 setting enables cam contact C105 to be effective, the relay RCT is energized at differential times corresponding to values 0-3-5-6 and 9 in the one mode of operation, whereas when the switch 80 is set so that cam contact C111 is effective, the relay RCT will be energized at differential times corresponding to values 1-2-4-7 and 8 in the other mode of operation.

Figure 2:
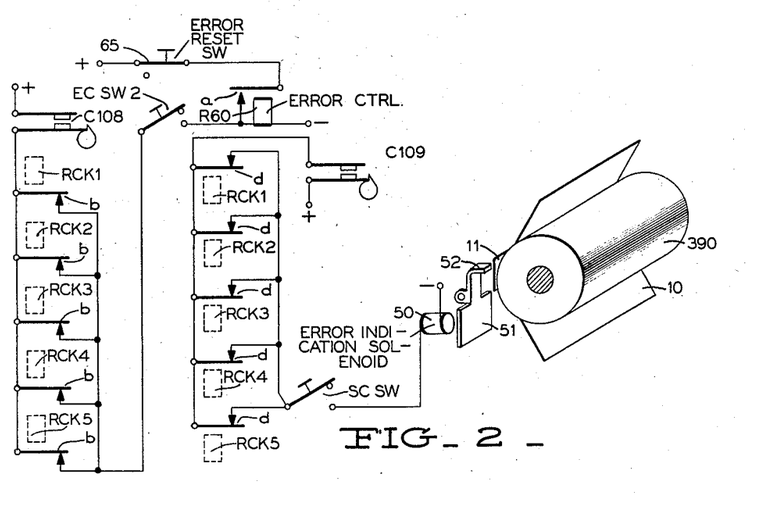
Fig. 2 shows error control circuits.

In Fig. 2, circuits are shown for controlling the printing of an error designation of any suitable form on the impression receiving sheet supported by the platen 390 forming a part of the 407 accounting machine. The error designation printing means is shown in schematic form. It comprises an error indication solenoid 50 having a cooperating armature 51 carrying an error printing type element 52 which is adapted to impress an error indication upon the sheet 10 whenever the solenoid 50 is energized on a printing cycle. This solenoid 50 is under control of an error control circuit which includes a plurality of *d* contacts arranged in parallel relationship and associated with the checking relays RCK1 through RCK5. The circuit further includes a cam contact C109 and a solenoid control switch SCSW.

Also shown in Fig. 2 is an error control relay R60 which is controlled by the closure of any one of five *b* contacts also arranged in parallel relationship and associated with the relays RCK1 through RCK5. This circuit further includes cam contacts C108 and an error control switch ECSW2. An error reset switch 65 is provided to drop out the error control relay 60 following its energization.

As an example, in the one mode of operation of the system, the binary storage relay R20 through R44, representing the five positions of binary storage, are adjusted in serial fashion under control of the tape reader with five columns of binary coded data, representing numerical information, derived from the tape by means of the tape reader. Each storage position includes the four fixed bit storing relays and a relay for storing the C bit, also referred to as the redundant bit. The C bit relays are identified respectively as R20, R25, R30, R35 and R40 and are energized whenever binary representations for the digit values 0-3-5-6 and 9 are stored, as well as the C bit for the blank column. At precise time intervals under control of cam contacts C103 and emitter 20, the associated binary-to-decimal translators provide decimal value outputs, including an X output, from the sockets 30 through 34. These outputs are determined in accordance with the binary bit representations stored in the five positions of binary storage. From the sockets 30 through 34 the output impulses are transmitted by way of plug wires PW1 through PW5 to sockets 940, position 1 through position 5, to energize the print magnets, five of which are shown, forming part of the Type 407 accounting machine. A typical circuit for energizing a print magnet 361 in position 1, for example during the first half of a print cycle, is traceable by means of a path extending through cam contacts C103, emitter 20, assuming a value 5 to be stored in the binary storage position 1, relay R21*e* normally open contacts, R22*c* normally closed contacts, R23*c* normally open contacts, R24*b* normally closed contacts, R02*e* normally open contacts, socket 30, plug wire PW1, socket 940 position 1, R843*a* normally closed contacts, R909*a* normally closed contacts, print magnet 361 position 1, zero print control circuits (ZPC), shown in block form, to a negative voltage source. It is to be remembered that the storing of the value 5 in the binary storage the C bit relay R20 is energized along with the four bit representing relay R23 and the one bit representing relay R21. Accordingly the C bit contact R20*b* in the checking circuit is shifted to a transferred position, in which position the relay will remain until the latter portion of the second half of the print cycle. The transferred position of this relay contact R20*b* in combination with an associated contact relay RCT*a*, in the same checking circuit, determine the energization of the associated check relay RCK1. According to the timing of cam contacts C105, which timing as seen in the time chart indicates that the C bit timing relay RCT will be energized at differential times corresponding to 0-3-5-6-9 and X on each half of the print cycle, the relay RCK1 will be energized during either the first half or the second half of the print cycle depending upon the setting of the Check Control Switch 1 and the cycle switch 75. Upon closure of relay RCK1*a* contacts, a hold circuit is established under control of cam contacts C110. Upon opening relay RCK1*d* contacts, and with the SCSW switch closed, the circuit to solenoid 50 is interrupted to prevent printing of an error impression.

At the same time, and with the error switch ECSW2 positioned to its On setting, the circuit to the error control relay 60 is also disrupted upon the opening up of the b contacts associated with the relays RCK1 through RCK5. The relay R60c contacts in the clutch 11 circuit thus remain closed to enable the tape reader to continue operations.

The above operations may also be effected during the second half of the print cycle. This is accomplished by comparing the so-called "echo" impulses with timings issued by cam contacts C105 during the latter half of the print cycle. For this operation it is necessary to position the cycle switch 75 to its B setting, in which setting relay RCKTR is energized on the latter half of the print cycle to enable energization of the checking relays RCK1 through RCK5.

A typical circuit for transmitting the so-called "echo" impulse to the checking circuit is traceable from a positive source (Fig. 1c) through cam contacts CR73 and CR106, type wheel contact 312, relay R777a contacts, socket 983, plugwire, socket CK1, relay RCTa contacts, relay R20b contacts, relay RCK1, Check Control Switch 1 to its A setting, relay RCKTRa contact now transferred, to the minus terminal.

Another variation with appropriate modification of the error control circuits in Fig. 2, may be derived by setting certain ones of the check control switches to say the A setting and others to their B settings. This will provide for dual checking operations in the same print cycle of operation in the event it is desired to check, for example, two different amounts on different halves of the same print cycle.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a printing machine having a plurality of settable printing members for printing numerical data under control of tape records, or the like, bearing combinations of coded elements for representing certain ones of the numerical characters 0 through 9 and other combinations including a redundant element for representing the remaining numerical characters; the combination with individual print entry control means for each settable printing member of individual data control means having means for storing the coded and redundant elements appropriate to each character derived from the record; said data control means including an emitter for supplying differentially timed machine impulses representing the characters 0 through 9, a plurality of code translators, coupled to said emitter, and each adjusted under control of an associated storage means to issue a numeric character impulse, appropriate to the code combination stored, to an associated one of said printing entry control means for setting up its associated printing member; a plurality of comparing circuits, one for each print entry control means, each circuit comprising a first and a second switch, each switch having either a normal or a transferred position; means for setting each first switch to a transferred position in response to the presence of the redundant element in the associated storage means; means for adjusting each second switch to a transferred position, at differentially timed intervals corresponding to the differentially timed impulses representing the remaining numerical characters for which each coded combination contains a redundant element; and output means conditioned by the switches for providing an output manifestation in response to the receipt of a character impulse whenever the switches are in corresponding positions.

2. In a printing machine having a plurality of settable printing members for printing numerical data under control of tape records, or the like, bearing combinations of coded elements for representing certain ones of the numerical characters 0 through 9 and other combinations including a redundant element for representing the remaining numerical characters; the combination with individual print entry control means for each settable printing member of individual data control means having means for storing the coded and redundant elements appropriate to each character derived from the record; said data control means including an emitter for supplying differentially timed machine impulses representing the characters 0 through 9, a plurality of code translators, coupled to said emitter, and each adjusted under control of an associated storage means to issue a numeric character impulse, appropriate to the code combination stored, to an associated one of said print entry control means for setting up its associated printing member; a plurality of comparing circuits, one for each print entry control means, each circuit comprising a first and a second switch, each switch having either a normal or a transferred position; means for setting each first switch to a transferred position in response to the presence of the redundant element in the associated storage means; means for adjusting each second switch to a transferred position, at differentially timed intervals corresponding to the differentially timed impulses representing the remaining numerical characters for which each coded combination contains a redundant element; and individual output means associated with each comparing circuit and conditioned by related first and second switches for providing an output manifestation in response to the receipt of a character impulse whenever the switches are in corresponding positions.

3. In a printing machine having a plurality of settable printing members for printing numerical data under control of tape records, or the like, bearing combinations of coded elements for representing certain ones of the numeric character 0 through 9 and other combinations including a redundant element for representing the remaining numerical characters 0–3–5–6 and 9; the combination with individual print entry control means for each settable printing member of individual data control means having means for storing the coded and redundant elements appropriate to each character derived from the record; said data control means including an emitter for supplying differentially timed machine impulses representing the characters 0 through 9, a plurality of code translators, coupled to said emitter, and each adjusted under control of an associated storage means to issue a numeric character impulse, appropriate to the code combination stored, to an associated one of said print entry control means for setting up its associated printing member; a plurality of comparing circuits, one for each print entry control means, each circuit comprising a first and a second switch, each switch having either a normal or a transferred position; means for setting each first switch to a transferred position in response to the presence of the redundant element of the associated storage means; means for adjusting each second switch to a transferred position, at differentially timed intervals corresponding to the differentially timed impulses representing the remaining numerical characters 0–3–5–6 and 9 for which each coded combination contains a redundant element; and individual output means associated with each comparing circuit and conditioned by related first and second switches for providing an output manifestation in response to the receipt of a character impulse whenever the switches are in corresponding position.

4. In a printing machine having a plurality of settable printing members for printing numerical data under control of tape records, or the like, bearing combinations of code elements arranged according to the binary code for representing the numeric characters 0 through 9, the combinations, in one form of the records, expressed by an even number of binary elements having a redundant element, whereas, in another form of the records the combinations expressed by an odd number of binary elements have a redundant element; the combination with individual print entry control means for each settable printing member of individual data control means having means for storing the coded and redundant elements appropriate to each character derived from the record; said data control means including an emitter for supplying differentially timed machine impulses representing the characters 0 through 9, a plurality of code translators, coupled to said emitter, and each adjusted under control of an associated storage means to issue a numeric character impulse, appropriate to the code combination stored, to an associated one of said print entry control means for setting up its associated printing member; individual comparing circuits one for each print entry control means, each circuit comprising a first and a second switch, each switch having either a normal or a transferred position; means for setting each first switch to a transferred position in response to the presence of the redundant element in the associated storage means; a code select switch having even and odd code selecting positions; means under control of said code select switch for adjusting the second switches to transferred positions at differentially timed intervals corresponding to the differentially timed impulses representing numerical characters whose coded combinations are either even or odd depending upon the position of the code select switch and the code form stored; and individual output means associated with each comparing circuit and conditioned by related first and second switches for providing an output manifestation in response to the receipt of a character impulse whenever the switches are in corresponding positions.

5. In a printing machine having a plurality of settable printing members for printing numerical data under control of tape records, or the like, bearing combinations of code elements arranged according to the binary code for representing the numeric characters 0 through 9, the combinations, in one form of the records, expressed by an even number of binary elements having a redundant element, whereas, in another form of the records the combinations expressed by an odd number of binary elements have a redundant element, and in both types of records the redundant element expressing a blank column; the combination with individual print entry control means for each settable printing member of individual data control means having means for storing the coded and redundant elements appropriate to each character derived from a record; said data control means including an emitter for supplying differentially timed machine impulses representing the characters 0 through 9, and a blank which represents the absence of a character, a plurality of code translators, coupled to said emitter, and each adjusted under control of an associated storage means to issue a numeric character impulse, appropriate to the code combination stored, or, an X impulse denoting a blank, to an associated one of said print entry control means for setting up its associated printing member; individual comparing circuits one for each print entry control means, each circuit comprising a first and a second switch, each switch having either a normal or a transferred position; means for setting each first switch to a transferred position in response to the presence of the redundant element in the associated storage means; a code select switch having even and odd code selecting positions; means under control of said code select switch for adjusting the second switches to transferred positions at differentially timed intervals corresponding to the differentially timed impulses representing numerical characters and a blank the coded combinations for which being either even or odd, depending upon the position of the code select switch and the code form stored; and individual output means associated with each comparing circuit and conditioned by related first and second switches for providing an output manifestation in response to the receipt of a character impulse, or an X impulse, whenever the switches are in corresponding positions.

6. In a cyclically operable printing machine of the character described having a plurality of settable printing members for printing numerical data under control of tape records, or the like, bearing combinations of code elements arranged according to the binary code for representing the numeric characters 0 through 9, the combinations, in one form of the records, expressed by an even number of binary elements having a redundant element, whereas, in another form of the records the combinations expressed by an odd number of binary elements have a redundant element; the combination with individual print entry control means for each settable printing member of individual data control means having means for storing the coded and redundant elements appropriate to each character derived from the record; said data control means including an emitter for supplying differentially timed machine impulses representing the characters 0 through 9, a plurality of code translators, coupled to said emitter, and each adjusted under control of an associated storage means to issue a numeric character impulse, appropriate to the code combination stored, to an associated one of said print entry control means for setting up its associated printing member during the first half of a print cycle; individual echo pulse means associated with each settable printing member for issuing a differentially timed character echo impulse, during the latter half of a print cycle, in response to the proper positioning of the settable printing member; individual comparing circuits one coupled to each echo pulse means, each circuit comprising a first and a second switch, each switch having either a normal or a transferred position; means for setting each first switch to a transferred position in response to the presence of the redundant element in the associated storage means; a code select switch having even and odd code selecting positions; means under control of said code select switch for adjusting the second switches to transferred positions at differentially timed intervals corresponding to the differentially timed impulses representing numerical characters whose coded combinations are either even or odd depending upon the position of the code select switch and the code combination stored; and individual output means associated with each comparing circuit and conditioned by related first and second switches for providing an output manifestation in response to the receipt of a character echo impulse whenever the switches are in corresponding positions.

7. Apparatus for determining the validity of numeric data translated from representations constituted of combinations of code elements representing values 1–2–4–8 in the binary code, the representations corresponding to the digit values 0–3–5–6 and 9 having in addition a redundant code element, comprising data storage means for storing the binary element values and redundant elements appropriate to each numeric representation; an emitter for supplying differentially timed impulses representing the characters 0 through 9; a code translator coupled to said emitter and adjusted under control of the data storage means to issue a numeric character impulse, appropriate to the code combination stored; a comparing circuit coupled to said translator and comprising first and second switches, each switch having either a normal position or a transferred position; means for setting the first switch to a transferred position in response to the presence of the redundant element in the storage means; means for adjusting the second switch to a transferred position at differentially timed intervals corresponding to the differentially timed impulses representing the values 0–3–5–6 and 9; and output means conditioned by the first and second switches for providing an output manifestation in response to the receipt of a character impulse whenever the switches are in corresponding positions.

8. Apparatus for determining the validity of numeric data translated from representations constituted of combinations of code elements representing values 1–2–4–8 in the binary code, the code combinations, in one form of the code, expressed by an even number of binary elements having a redundant element, whereas in another form of the code, the code combinations expressed by an odd number of binary elements have a redundant element, comprising data storage means for storing the binary and redundant elements appropriate to each numeric representation; an emitter for supplying differentially timed impulses representing the characters 0 through 9; a code translator coupled to said emitter and adjusted under control of the data storage means to issue a numeric character impulse, appropriate to the code combination stored; a comparing circuit coupled to said translator and comprising first and second switches, each switch having either a normal position or a transferred position; means for setting the first switch to a transferred position in response to the presence of the redundant element in the storage means; a code select switch having even and odd code selecting positions; means under control of said code select switch for adjusting the second switch to transferred positions at differentially timed intervals corresponding to the differentially timed impulses representing numerical characters whose coded combinations are either even or odd depending upon the position of the code select switch and the code stored; and output means conditioned by the first and second switches for providing an output manifestation in response to the receipt of a character impulse whenever the switches are in corresponding positions.

9. Apparatus for determining the validity of numeric data translated from representations constituted of combinations of code elements representing values 1–2–4–8 in the binary code, the code combinations, in one form of the code, expressed by an even number of binary elements having a redundant element, whereas in another form of the code, the code combinations expressed by an odd number of binary elements have a redundant element, and in both code forms the redundant element expressing a blank comprising an emitter for supplying differentially timed impulses representing the characters 0 through 9 and a blank; a code translator coupled to said emitter and adjusted under control of the data storage means to issue a numeric character impulse, appropriate to the code combination stored, or an appropriate impulse when no combination is stored; a comparing circuit coupled to said translator and comprising first and second switches, each switch having either a normal position or a transferred position; means for setting the first switch to a transferred position in response to the presence of the redundant element in the storage means; a code select switch having even and odd code selecting positions; means under control of said code select switch for adjusting the second switch to transferred positions at differentially timed intervals corresponding to the differentially timed impulses representing numerical characters and a blank the coded combinations for which being either even or odd depending upon the position of the code select switch and the code stored; and output means conditioned by the first and second switches for providing an output manifestation in response to the receipt of a character impulse, or said appropriate impulse, whenever the switches are in corresponding positions.

References Cited in the file of this patent

UNITED STATES PATENTS 2,343,398     Bryce                  Mar. 7, 1944